United States Patent
Lee et al.

(10) Patent No.: US 9,632,337 B2
(45) Date of Patent: Apr. 25, 2017

(54) METHOD FOR MANUFACTURING A LIQUID CRYSTAL DISPLAY PANEL AND A MANUFACTURING DEVICE THEREFOR

(71) Applicants: SAMSUNG DISPLAY CO., LTD., Yongin, Gyeonggi-Do (KR); TOPTEC CO., LTD, Gyeongsangbuk-do (KR)

(72) Inventors: Kwang Ho Lee, Seoul (KR); Young Bae Kim, Gyeonggi-do (KR); Hyeok Yun Kwon, Chungcheongnam-do (KR); Sang Il Kim, Gyeonggi-do (KR); Jong Seong Kim, Seoul (KR)

(73) Assignees: SAMSUNG DISPLAY CO., LTD., Yongin, Gyeonggi-Do (KR); TOPTEC CO., LTD., Gum-si, Gyeongsangbuk-Do (KR)

( * ) Notice: Subject to any disclaimer, the term of this patent is extended or adjusted under 35 U.S.C. 154(b) by 1 day.

(21) Appl. No.: 14/336,425

(22) Filed: Jul. 21, 2014

(65) Prior Publication Data
US 2015/0140889 A1    May 21, 2015

(30) Foreign Application Priority Data
Nov. 18, 2013  (KR) .......................... 10-2013-0139978

(51) Int. Cl.
G02F 1/1333    (2006.01)
G02F 1/13    (2006.01)
B32B 38/00    (2006.01)
B32B 38/10    (2006.01)

(52) U.S. Cl.
CPC ........ G02F 1/1303 (2013.01); B32B 38/0004 (2013.01); B32B 38/10 (2013.01); *B32B 2457/202* (2013.01)

(58) Field of Classification Search
None
See application file for complete search history.

(56) References Cited

U.S. PATENT DOCUMENTS

2014/0170923 A1* 6/2014 Sanglier ................... H01J 9/50
445/2

FOREIGN PATENT DOCUMENTS

| KR | 20110063800 | 6/2011 |
| WO | 2010090147 | 8/2010 |

* cited by examiner

*Primary Examiner* — Ashok Patel
(74) *Attorney, Agent, or Firm* — F. Chau & Associates, LLC

(57) ABSTRACT

A manufacturing device for a liquid crystal display panel includes a stage including a first stage part and second stage part. The stage is configured to support a substrate laminate. A knife includes an entrance portion and a rigidity securing portion. The knife is configured to peel a support substrate of the substrate laminate. The stage is configured to rotate in a direction parallel with a surface of the stage. The rigidity securing portion of the knife is thicker than an entrance portion of the knife.

11 Claims, 9 Drawing Sheets

METHOD FOR MANUFACTURING A LIQUID CRYSTAL DISPLAY PANEL AND A MANUFACTURING DEVICE THEREFOR

CROSS-REFERENCE TO RELATED APPLICATION

This application claims priority under 35 U.S.C. §119 to Korean Patent Application No. 10-2013-0139978 filed in the Korean Intellectual Property Office on Nov. 18, 2013, the disclosure of which is incorporated by reference herein in its entirety.

(a) TECHNICAL FIELD

The present invention relates to a method for manufacturing a liquid crystal display panel and a manufacturing device therefor.

(b) DISCUSSION OF RELATED ART

A liquid crystal display (LCD) is a widely used flat panel display. An LCD includes two display panels provided with field generating electrodes such as pixel electrodes and a common electrode, and a liquid crystal layer interposed between the display panels. In the LCD, images are displayed by applying different potentials to the pixel electrode and the common electrode to generate an electric field in the liquid crystal layer, wherein the electric field changes an orientation of liquid crystal molecules in the liquid crystal layer to control the polarization of incident light.

The liquid crystal display panel is a portion of an LCD which corresponds to a display unit of the LCD. In the liquid crystal display panel, a liquid crystal material is filled between an upper display panel on which the common electrode, a color filter, and the like are formed and a lower display panel on which a thin film transistor, the pixel electrode, and the like are formed. The upper display panel and the lower display panel are bonded to each other.

The upper display panel and the lower display panel of the liquid crystal display panel may be manufactured by forming a member for a display panel, such as the common electrode and the color filter, on a glass substrate having a thickness of about 0.5 mm to about 0.7 mm. Therefore, the liquid crystal display panel, which includes the upper display panel and the lower display panels bonded to each other, may exceed about 1 mm in thickness.

In mobile devices, such as a tablet personal computer (PC), a laptop, or a smart phone, a thin liquid crystal display panel is used. By using a glass substrate etched with a chemical material such as hydrofluoric acid, a liquid crystal display panel thin with a thickness of, for example, about 0.2 to about 0.4 mm has been made.

However, etching the glass substrate may pollute the environment due to the chemical materials used. Therefore, the use of a thin substrate at the beginning of the manufacturing process has been proposed; however, this may result in many broken substrates.

SUMMARY

Exemplary embodiments of the present invention provide a method for manufacturing a liquid crystal display panel using a thin film substrate and a support substrate.

Exemplary embodiments of the present invention provide a manufacturing device for a liquid crystal display panel capable of separating a support substrate from a thin film substrate.

According to n exemplary embodiment of the present invention a manufacturing device for a liquid crystal display panel including a stage including a first stage part and a second stage part. The stage is configured to support a substrate laminate. A knife includes an entrance portion and a rigidity securing portion. The knife is configured to peel a support substrate from the substrate laminate. The stage is configured to rotate in a direction parallel with a surface of the stage. The rigidity securing portion of the knife is thicker than the entrance portion of the knife.

The second stage part may be disposed at a corner of the stage and the second stage part may move vertically in a downward direction from a surface on which the stage is disposed.

The second stage part is configured to be fixed to the first stage part when the first stage part supports the substrate laminate and after initially peeling the substrate laminate. The second stage part is configured to move in a downward direction from a surface of the first stage part when the knife for peeling the support substrate from the substrate contacts the support substrate.

The entrance portion of the knife may have a tapered shape. The rigidity securing portion of the knife may include a first portion and a second portion, and the second portion may be thicker than the first portion.

A tapered angle of the entrance portion of the knife may be about 5° to about 15°.

A central portion of a length direction of the entrance portion of the knife may have a thickness of about 0.1 mm to about 0.2 mm.

A length ratio of the entrance portion, the first portion, and the second portion may be about 1:1:1.

A thickness of the second portion of the knife may be about 0.5 mm to about 2 mm.

A thickness ratio of the first portion and the second portion of the knife may be about 1:2.

The second stage part may include a plurality of second stage parts disposed at a plurality of corners of the stage.

The second stage part may further include an adsorption portion which is disposed on an upper surface of the second stage part. The second stage part may be tilted with respect to the surface of the first stage part.

The adsorption portion may adsorb the support substrate of the substrate laminate.

According to an exemplary embodiment of the present invention a method for manufacturing a liquid crystal display panel includes adhering first thin film substrate to a first support substrate and a second thin film substrate to a second support substrate. A member for a display panel is formed on a surface of each of the thin film substrates. A substrate laminate is manufactured by bonding the first thin film substrate to the second thin film substrate. The substrate laminate is supported on a stage including a first stage part and a second stage part. The stage is rotated so that the second stage part is aligned with a knife. Each of the support substrates are separated from the substrate laminate using the knife. The knife includes an entrance portion and a rigidity securing portion. The rigidity securing portion of the knife is thicker than the entrance portion of the knife.

An initial insertion angle of the entrance portion of the knife into the substrate laminate may be about 2° to about 20°.

The second stage part may be fixed to the first stage part when the first stage part supports the substrate laminate and after an initial peeling of the substrate laminate. The second stage part may move downward from a surface of the first stage part when the knife for peeling each of the support substrate of the substrate laminate contacts the support substrate.

The entrance portion of the knife may have a tapered shape. The rigidity securing portion of the knife may include a first portion and a second portion. The second portion may be formed to be thicker than the first portion.

A plurality of the second stage parts may be formed at a plurality of corners of the stage.

The initial peeling may be performed at all of the plurality of second stage parts.

The second stage part may further include an adsorption portion which adsorbs the support substrate and which is formed on a surface of the second stage part. The second stage part may be tilted with respect to a surface of the first stage part.

The support substrate may be separated using a vacuum or adsorption jig after separating each of the support substrates from the substrate laminates.

BRIEF DESCRIPTION OF THE DRAWINGS

A more complete appreciation of the present invention and many of the attendant aspects thereof will be readily obtained as the same becomes better understood by reference to the following detailed description when considered in connection with the accompanying drawings.

DETAILED DESCRIPTION OF THE EMBODIMENTS

Figure 1:
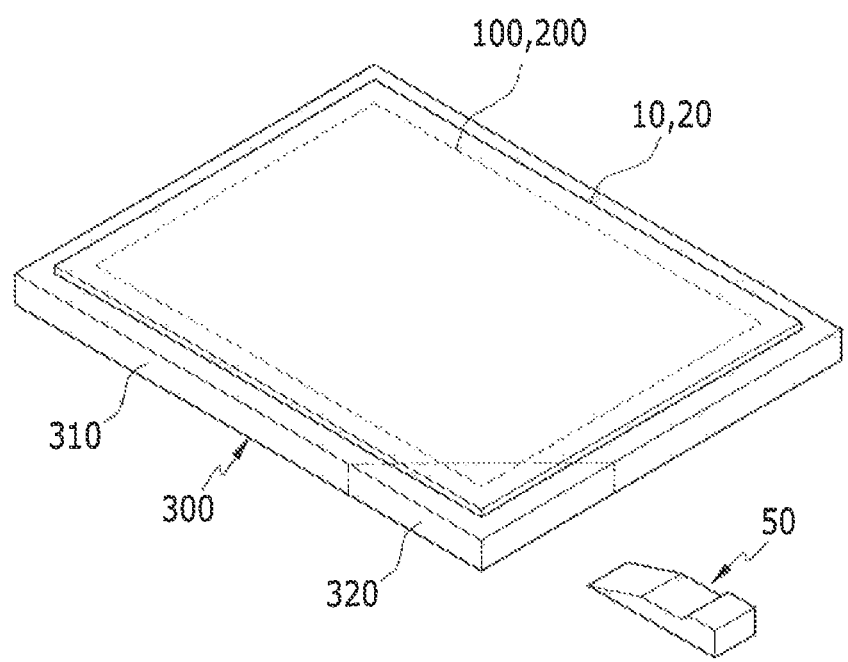
FIG. 1 is a perspective view illustrating a manufacturing device for a liquid crystal display panel according to an exemplary embodiment of the present inversion.

The present invention will be described more fully hereinafter with reference to the accompanying drawings, in which exemplary embodiments of the invention are shown. However, the described embodiments may be modified in various different ways, and should not be construed as limited to the embodiments disclosed herein.

In the drawings, the thickness of layers, films, panels, regions, etc., may be exaggerated for clarity. Like reference numerals may refer to like elements throughout the specification. It will be understood that when an element such as a layer, film, region, or substrate is referred to as being "on" another element, it can be directly on the other element or intervening elements may also be present.

A manufacturing device for a liquid crystal display panel according to an exemplary embodiment of the present invention will be described in more detail with reference to FIG. 1.

FIG. 1 is a perspective view illustrating a manufacturing device for a liquid crystal display panel according to an exemplary embodiment of the present invention.

As illustrated in FIG. 1, the manufacturing device for a liquid crystal display panel according to an exemplary embodiment of the present invention includes a stage 300 that supports substrate laminates 100, and 200, and support substrates 10, and 20 and a knife 50 that peels the support substrates 10 and 20 from the substrate laminates 100, and 200.

The stage 300 may have a flat, rectangular plate to support the substrate laminates 100, and 200, and support substrates 10 and 20 and may have an area larger than that of the substrate laminates 100, and 200, and the support substrates 10, and 20.

The stage 300 may include a main stage 310 and an auxiliary stage 320. The auxiliary stage 320 may be separated from the main stage 310 and may move vertically in a downward direction of a surface on which the stage 300 is disposed in a separated state.

A portion of the stage 300 at which the auxiliary stage 320 is disposed may be a portion for initially peeling the support substrates 10 and 20 from the substrate laminates 100, and 200. For the knife 50 to enter the substrate laminates 100, and 200, and support substrates 10, and 20, the auxiliary stage 320 may move vertically in a downward direction of the surface on which the stage 300 is disposed, at the time of performing the initial peeling, so as to facilitate the initial peeling of the support substrates 10 and 20 from the substrate laminates 100, and 200.

The auxiliary stage 320 of the stage 300 according to an exemplary embodiment of the present invention may be disposed at a corner of the stage 300 and an auxiliary stage 320 may be disposed to initially peel the support substrates 10 and 20 from the substrate laminates 100, and 200.

The knife 50 which may be disposed on a side of the stage 300 may enter a bonded portion between the support substrates 10 and 20 and the thin film substrates 100 and 200 of the substrate laminates 100, and 200 to initially peel the support substrates 10 and 20 from the thin film substrates. Hereafter, the thin film substrates may be referred to using the same reference numerals 100 and 200 as the substrate laminates 100 and 200.

In order for the knife 50 to peel the support substrates 10 and 20 and the thin film substrates 100 and 200 of the substrate laminates 100, and 200, the knife may freely move in all directions so that a position of the knife 50 may enter at the sides of the substrate laminates 100, and 200, and support substrates 10, and 20 disposed on the stage 300.

The knife 50 may be configured to have various entrance angles so that the knife 50 may enter at a predetermined angle when initially peeling the support substrates 10 and 20 from the thin film substrates 100 and 200.

The knife 50 may include a plurality of regions such as an entrance portion and a rigidity securing portion. The entrance portion may be a blade portion of the knife 50 for initially peeling the support substrates 10 and 20 from the thin film substrates 100 and 200 and a tip portion of the entrance portion may be thinly formed with a thickness of about 0.2 mm or less because the thin film substrates 100 and 200 may, have a thickness of about 0.2 mm.

The rigidity securing portion of the knife 50 may be a region for securing the rigidity of the knife 50 and may be formed to be thicker than the entrance portion thereof and the rigidity securing portion may be formed of a plurality of regions each of which may be formed with various thicknesses.

To increase the rigidity of the knife 50 toward an opposite region of the entrance portion among the plurality of regions of the rigidity securing portion of the knife 50, the rigidity securing portion may be formed to be thicker than the region near the entrance portion of the rigidity securing portion of the knife 50.

When the rigidity securing portion is not formed in the knife 50, the entrance portion of the knife 50 may be relatively thin, such that the knife 50 need not keep a predetermined form.

A stage in a manufacturing device for a liquid crystal display panel according to an exemplary embodiment of the present invention will be described in more detail below with reference to FIGS. 2 and 3.

Figure 2:
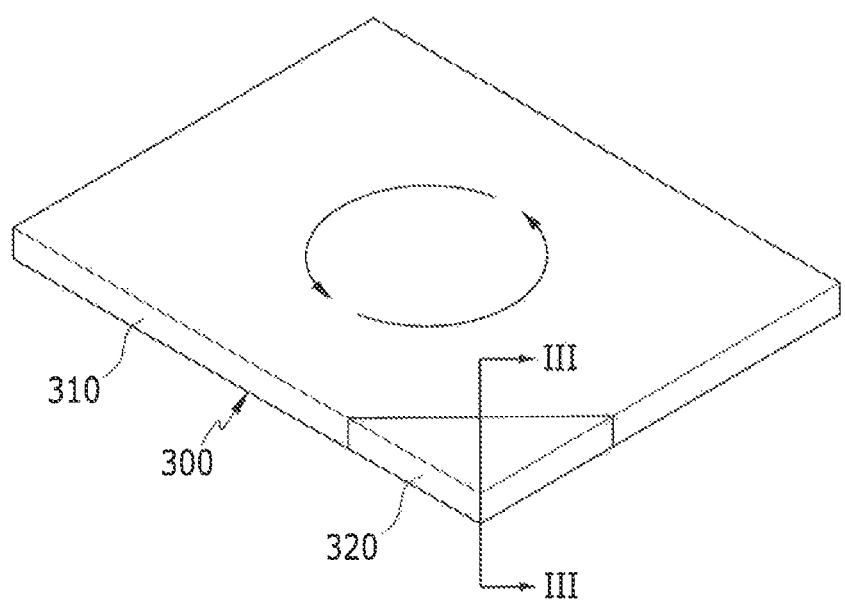
FIG. 2 is a perspective view illustrating a stage in the manufacturing device for a liquid crystal display panel according to an exemplary embodiment of the present invention.
Figure 3:
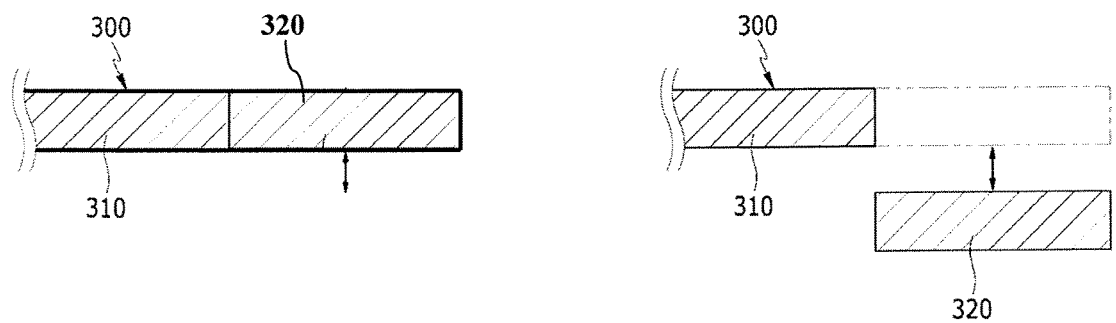
FIG. 3 illustrates a cross-sectional view taken along line III-III of FIG. 2 before and after an auxiliary stage is separated from a main stage according to an exemplary embodiment of the present invention.

FIG. 2 is a perspective view illustrating a stage in the manufacturing device for a liquid crystal display panel according to an exemplary embodiment of the present invention and FIG. 3 is cross-sectional view taken along line III-III of FIG. 2.

As illustrated in FIG. 2, the stage 300 may include the main stage 310 and the auxiliary stage 320.

The stage 300 according to an exemplary embodiment of the present invention may rotate in a direction parallel with the surface of the stage so that the stage 300 may be aligned with the knife 50 in the state in which, the substrate laminates 100, and 200, and support substrates 10 and 20 are supported on the stage 300.

The stage 300 may rotate to direct the auxiliary stage 320 of the stage 300 to a direction in which the knife 50 is disposed so that the knife 50 for initially peeling the substrate laminates 100, and 200, and support substrates 10, and 20 is entered in the state in which the substrate laminates 100, and 200, and support substrates 10, and 20 are supported on the stage 300.

The stage 300 may rotate clockwise or counterclockwise.

Referring to FIG. 3, the auxiliary stage 320 which may be formed at one corner of the stage 300 may move vertically in a downward direction of the surface of the stage 300.

The support substrates 10 and 20 may be initially peeled at the portion of the stage 300 at which the auxiliary stage 320 is disposed, and the knife 50 may enter the portion of the stage 300 at which the auxiliary stage 320 is formed so as to initially peel the support substrates 10 and 20 from the thin film substrates 100 and 200.

When the substrate laminates 100, and 200, and support substrates 10, and 20 are supported; the auxiliary stage 320 may be fixed on a surface of the main stage 310 to support front surfaces of the substrate laminates 100, and 200, and support substrates 10, and 20.

When the auxiliary stage 320 uses the knife 50 to initially peel the support substrates 10 and 20 from the thin film substrates 100 and 200, the auxiliary stage 320 may move vertically in a downward direction of the surface of the stage 300 to secure a space in which the knife 50 initially peels the support substrates 10 and 20 from the thin film substrates 100 and 200.

When the support substrates 10 and 20 are initially peeled from the thin film substrates 100 and 200, the auxiliary stage 320 may move downward from the surface of the stage 300 to a sufficient distance to secure the space which may allow the knife 50 to enter.

After initially peeling the support substrates 10 and 20 from the thin film substrates 100 and 200, the auxiliary stage 320 may move upward to the same height as the surface on which the main stage 310 is disposed, and support the support substrates 10 and 20 and the thin film substrates 100 and 200 which are subjected to the initial peeling.

The knife 50 according to an exemplary embodiment of the present invention will be described in more detail below with reference to FIGS. 4 and 5.

Figure 4:
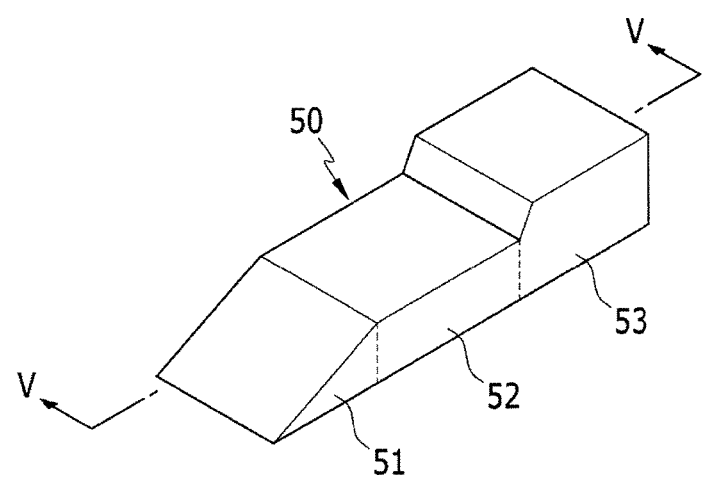
FIG. 4 is a perspective view illustrating a knife in the manufacturing device for a liquid crystal display panel according to an exemplary embodiment of the present invention.
Figure 5:
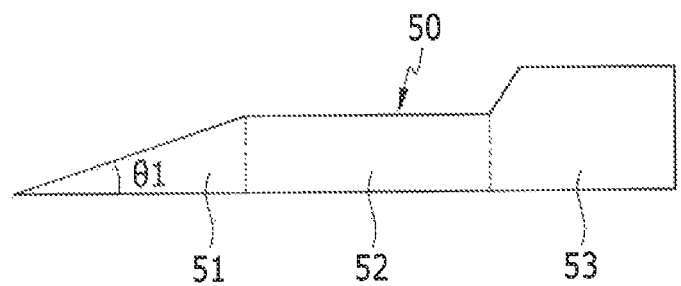
FIG. 5 is a cross-sectional view taken along line V-V of FIG. 4.

Referring to FIGS. 4 and 5, the knife 50 which may be formed on the side of the stage 300 may enter the bonded portion between the support substrates 10 and 20 and the thin film substrates 100 and 200 to initially peel the support substrates 10 and 20 from the thin film substrates 100 and 200.

For the knife 50 to peel the support substrates 10 and 20 and the thin film substrates 100 and 200, the knife 50 may move in all directions so that a position of the knife 50 may be controlled at the sides of the substrate laminates 100, and 200, and the support substrates 10, and 20 formed on the stage 300.

The knife 50 may have various entrance angles so that the knife 50 may enter at a predetermined angle when initially peeling the support substrates 10 and 20 from the thin film substrates 100 and 200.

The knife 50 may have various entrance angles so that when the lower support substrate 10 is initially peeled, the knife 50 may be entered in a form in which the knife 50 is inclined from the top to the bottom and when the upper support substrate 20 is initially peeled, the knife 50 may be entered in a form in which the knife 50 is inclined from the bottom to the top.

The knife 50 may include three regions, in other words, an entrance portion 51, a first portion 52, and a second portion 53. The entrance portion 51 may be a blade portion of the knife 50 for initially peeling the support substrates 10 and 20 from the thin film substrates 100 and 200 and a tip portion of the entrance portion 51 may be thinly formed with a thickness of about 0.2 mm or less because the thin film substrates 100 and 200 may have a thickness of about 0.2 mm.

The entrance portion 51 may be a blade portion of the knife 50 and have a shape tapered at a predetermined angle, in which a tapered angle $\theta 1$ of the entrance portion 51 of the knife 50 according to an exemplary embodiment of the present invention may be an angle of about 5° to about 15°, or for example, from about 7° to about 9'.

About a half of the total length of the entrance portion 51 of the knife 50 may be associated with the initial peeling at the time of initially peeling the substrate laminates 100, and 200, and support substrates 10, and 20 and when the tapered angle θ1 of the entrance portion 51 of the knife 50 is about 5° to about 15°, a thickness of a portion associated with the initial peeling in the entrance portion 51 may be smaller than about 0.2 mm which may be the thickness of the thin film substrates 100 and 200. However, the tapered angle θ1 of the entrance portion 51 of the knife 50 depending on the thickness of the thin film substrates 100 and 200 is not limited thereto, and therefore may be variously formed.

The first portion 52 and the second portion 53 of the knife 50 may secure the rigidity of the knife 50 and may be thicker than the entrance portion 51.

The second portion 53 of the knife 50 may be thicker than the first portion 52 of the knife 50 and may increase the rigidity of the knife 50.

If the first portion 52 and the second portion 53 are not formed in the knife 50, the entrance portion 51 of the knife 50 may be relatively thin, and the knife 50 might not maintain a predetermined form.

A length ratio of the entrance portion 51, the first portion 52, and the second portion 53 of the knife 50 may be about 1:1:1, but the length ratio is not limited thereto and may be a variety of length ratios.

The second portion 53 may correspond to a thickest portion of the knife 50 and may be formed with a thickness of about 0.5 mm to about 2 min. When the second portion 53 is too thinly formed, the rigidity of the knife 50 might not be sufficiently secured and when the second portion 53 is too thickly formed, the initial peeling of the substrate laminates 100, and 200, and support substrates 10, and 20 might be obstructed.

A thickness ratio of the first portion 52 and the second portion 53 may be about 1:2, but the thickness ratio is not limited thereto and may be a variety of thickness ratios.

The substrate laminates 100 and 200 and support substrates 10 and 20 according to an exemplary embodiment of the present invention will be described in more detail below with reference to FIGS. 6 and 7.

Figure 6:
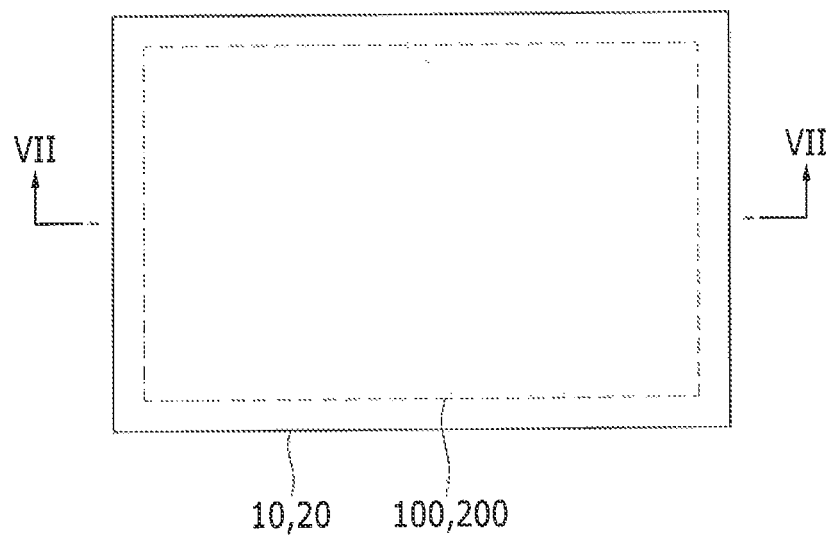
FIG. 6 is a diagram illustrating a substrate laminate before a support substrate is peeled from the substrate laminate in the manufacturing of the liquid crystal display panel according to an exemplary embodiment of the present invention.
Figure 7:
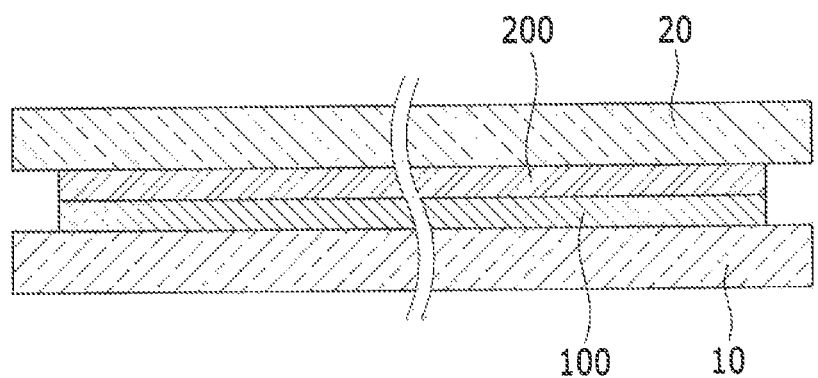
FIG. 7 is a cross-sectional view taken along line VII-VII of FIG. 6.

FIG. 6 is a diagram illustrating a substrate laminate before a support substrate is peeled from the substrate laminate in the manufacturing of the liquid crystal display panel according to an exemplary embodiment of the present invention and FIG. 7 is a cross-sectional view taken along line of FIG. 6.

Referring to FIGS. 6 and 7, in the substrate laminates 100, and 200, and support substrates 10, and 20, the lower thin film substrate 100 and upper thin film substrate 200 may be disposed between the lower support substrate 10 and upper support substrate 20. In FIG. 6, the lower thin film substrate 100 and the upper thin film substrate 200 may be covered with the lower support substrate 10 and the upper support substrate 20. The lower thin film substrate 100 and the upper thin film substrate 200 are denoted by a dotted line. A liquid crystal layer (not illustrated) may be disposed between the lower thin film substrate 100 and the upper thin film 115 substrate 200.

The lower support substrate 10 and the upper support substrate 20 may adhere to the lower thin film substrate 100 and the upper thin film substrate 200 and the adhered substrates may undergo a high temperature process for forming a display panel, such that an adhesion thereof may be increased.

A surface of the upper thin film substrate 200 which may be disposed on the upper support substrate 20 may include a common electrode which may include a transparent conductor such as indium tin oxide (ITO). The upper thin film substrate 200 may include a color filter and may be referred to as a color filter display panel or a color filter substrate.

In the lower thin film substrate 100 which may be disposed on the lower support substrate 10, a surface facing the upper thin film substrate 200 may include a thin film transistor TFT, a pixel electrode, and the like. A source terminal of the TFT may be connected to a data line, a gate terminal thereof may be connected to a gate line, and a drain terminal may be connected to the pixel electrode, in which lines other than the pixel electrode may include a metal. The metal may be a light reflective material. The lower thin film substrate 100 may be referred to as a thin film transistor array panel or a thin film transistor substrate. The lower thin film substrate 100 may include the color filter in addition to the thin film transistor. In this case, the upper thin film substrate 200 might not include the color filter.

The lower thin film substrate 100 and the upper thin film substrate 200 may be bonded to each other and a liquid crystal material may be filled between the lower thin film substrate 100 and the upper thin film substrate 200 by dropping or injection. When the thin film transistor is turned-on by applying an electrical signal to the gate line and the source line of the thin film transistor of the lower thin film substrate 100, an electric field may be formed between the pixel electrode of the lower thin film substrate 100 and the common electrode of the upper thin film substrate 200. An orientation of liquid crystal molecules which may be present between the lower thin film substrate 100 and the upper thin film substrate 200 may be changed by the electric field and light transmittance may be changed depending on the changed orientation of the liquid crystal molecules, thereby displaying a desired image.

FIGS. 6 and 7 illustrate that a size of the lower thin film substrate 100 and the upper thin film substrate 200 may be slightly smaller than that of the lower support substrate 10 and the upper support substrate 20. When the thin film substrates 100 and 200 adhere to the support substrates 10 and 20, the thin film substrates 100 and 200 might not adhere to the support substrates 10 and 20 so that opposite ends of the thin film substrates 100 and 200 are matched with opposite ends of the support substrates 10 and 20.

When the size of the thin film substrates 100 and 200 are equal to that of the support substrates 10 and 20, and when the thin film substrates 100 and 200 do not adhere to the support substrates 10 and 20 so that opposite ends of the thin film substrates 100 and 200 are matched with opposite ends of the support substrates 10 and 20, a portion of an edge of the thin film substrates 100 and 200 may not be supported by the support substrates 10 and 20. The portions of the thin film substrates 100 and 200 which are not supported may be exposed to the outside of the support substrates 10 and 20 during the manufacturing process of the display panel and therefore may be broken. The size of the lower thin film substrate 100 and the upper thin film substrate 200 may be about 0.5 mm to about 3.5 mm smaller in a horizontal direction and a vertical direction than that of the lower support substrate 10 and the upper support substrate 20.

However, the size of the lower thin film substrate 100 and the upper thin film substrate 200 is not necessarily smaller than that of the lower support substrate 10 and the upper support substrate 20 and may be equal to that of the lower support substrate 10 and the upper support substrate 20.

When a whole surface of the thin film substrates 100 and 200 is coated with a photoresist by, for example, a slit coater during the process of forming the thin film substrates 100 and 200, the support substrates 10 and 20 may be coated with the photoresist. When the photoresist is removed by a developing process, the photoresist may remain at boundaries between edges of the thin film transistors 100 and 200 and the support substrates 10 and 20. The photoresist may act as an adhesive between the thin film substrates 100 and 200 and the support substrates 10 and 20 and may hinder the peeling of the support substrates 10 and 20 from the thin film substrates 100 and 200. When the thin film substrates 100 and 200 adhere to the support substrates 10 and 20 so that both ends of the thin film substrates 100 and 200 are matched with those of the support substrates 10 and 20, the size of the thin film substrates 100 and 200 may be equal to that of the support substrates 10 and 20.

A method of manufacturing a liquid crystal display panel according to an exemplary embodiment of the present invention will be described in more detail below with reference to FIGS. 8 to 10.

Figure 8:
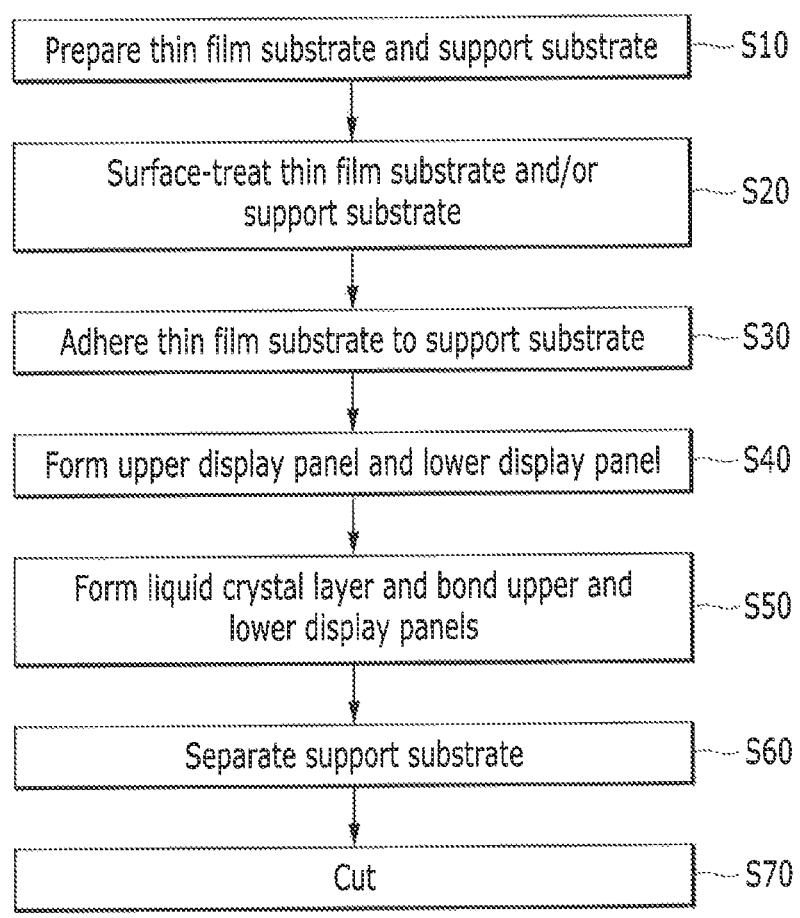
FIG. 8 is a process flowchart of a method for manufacturing a liquid crystal display panel according to an exemplary embodiment of the present invention.
Figure 9:
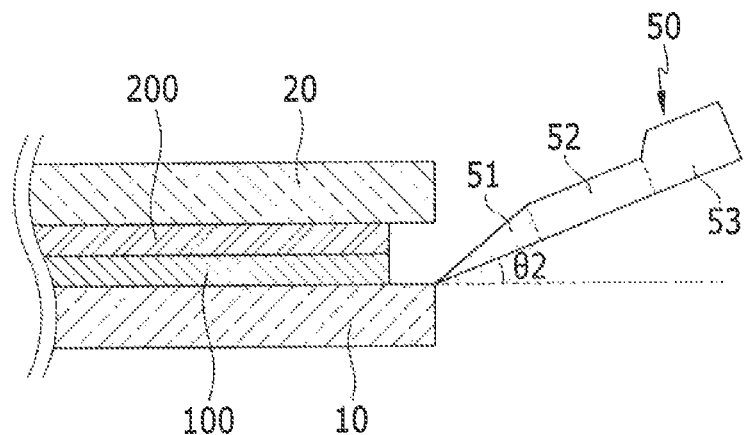
FIGS. 9 and 10 are diagrams illustrating a form in which a support substrate is initially peeled using a knife in the method for manufacturing a liquid crystal display panel according to an exemplary embodiment of the present invention.
Figure 10:
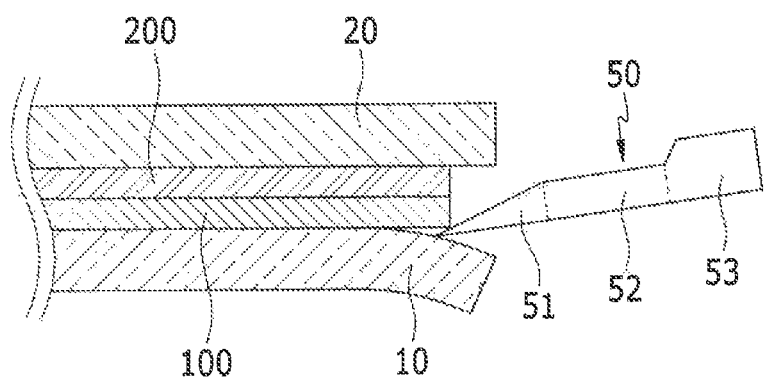

FIG. 8 is a process flowchart of a method for manufacturing a liquid crystal display panel according to an exemplary embodiment of the present invention and FIGS. 9 and 10 are diagrams illustrating a form in which a support substrate is initially peeled using a knife in the method for manufacturing a liquid crystal display panel according to an exemplary embodiment of the present invention.

As illustrated in FIG. 8, the thin film substrates 100 and 200 and the support substrates 10 and 20 are prepared (S10). The thin film substrates 100 and 200 may be transparent insulating substrates for forming the upper thin film substrate 200 and the lower thin film substrate 100 described in more detail below, for example, a glass substrate. The support substrates 10 and 20 may be substrates which support the thin film substrates 100 and 200 so that the thin film substrates 100 and 200 are not broken during the process of manufacturing the liquid crystal display panel, for example, a glass substrate. For manufacturing a single liquid crystal display panel, the thin film substrates 100 and 200 and the support substrates 10 and 20 may each be prepared as two sheets.

The thin film substrates 100 and 200 may have a thickness of, for example, about 0.2 mm or less, for example, a thickness of about 0.1 mm. The support substrates 10 and 20 may have a thickness of, for example, about 0.4 mm or more, for example, a thickness of about 0.5 mm. The thin film substrates 100 and 200 may be cut in a rectangular shape having a predetermined size and may undergo a cleaning process.

Next, the prepared thin film substrates 100 and 200 and support substrates 10 and 20 are surface-treated (S20) and the thin film substrates 100 and 200 are adhered to the support substrates 10 and 20 (S30). Two sets of adhering substrates in which the thin film substrates 100 and 200 adhere onto the support substrates 10 and 20 may be prepared and each of the adhering substrates may be used to form the upper thin film substrate 200 and the lower thin film substrate 100.

The surface treatment of the thin film substrates 100 and 200 and the support substrates 10 and 20 may include performing hydrophobic treatment on a surface to which the thin film substrates 100 and 200 and the support substrates 10 and 20 adhere. The surface treatment may be performed on only one of the thin film substrates 100 and 200 and the support substrates 10 and 20. The hydrophobic treatment may be performed by a wet method. The hydrophobic treatment may be performed at a contact angle of, for example, about 30° or more, for example, about 40° to about 70°.

The hydrophobic treatment may peel the support substrates 10 and 20 from the upper and lower thin film substrates 100 and 200 when the support substrates 10 and 20 are bonded to the upper thin film substrate 200 and to the lower thin film substrate 100. The hydrophobic treatment may separate the support substrates 10 and 20 during the process of manufacturing the liquid crystal display panel.

After undergoing the surface treatment, the thin film substrates 100 and 200 and the support substrates 10 and 20 may be adhered to each other by using the surface treated surface as the adhering surface. The adhering may be performed without adding an adhering material between the thin film substrates 100 and 200 and the support substrates 10 and 20. As described above, the thin film substrates 100 and 200 may undergo the cleaning process. For example, after the cleaning, a minute amount of moisture may remain on the surface of the thin film substrates 100 and 200. The thin film substrates 100 and 200 and the support substrates 10 and 20 may adhere to each other by a hydrogen bond due to the moisture. In addition, van der Waals forces or static electricity may be involved in the adhering.

The adhering of the thin film substrates 100 and 200 and the support substrates 10 and 20 may be performed by a roll-to-sheet lamination process.

Next, the upper thin film substrate 200 and the lower thin film substrate 100 are formed (S40). Members for a display panel, such as an electrode, a thin film transistor, the color filter, a light blocking member, and a passivation layer, may be formed on the sides of the thin film substrates 100 and 200 of each of the adhering substrates to form the upper thin film substrate 200 and the lower thin film substrate 100. When the thin film substrates 100 and 200 are formed while being supported by the support substrates 10 and 20, the upper thin film substrate 200 and the lower thin film substrate 100 may be formed without the thin film substrates 100 and 200 being broken. For example, the thin film substrates 100 and 200 may not be broken in a process line which is optimized for the substrate having a thickness of about 0.5 mm to about 0.7 mm.

The lower thin film substrate 100 may be, for example, a thin film transistor array panel (referred to as a TFT substrate or an array substrate) on which the thin film transistor and the like are formed. The upper thin film substrate 200 may be a color filter display panel (referred to as a CF substrate and an opposing substrate) on which the color filter, and the like are formed. The upper thin film substrate 200 and the lower thin film substrate 100 may be formed while being supported on the support substrates 10 and 20. In forming the upper thin film substrate 200 and the lower thin film substrate 100, the upper thin film substrate 200 and the lower thin film substrate 100 may undergo the high temperature process described above and the adhesion between the thin film substrates 100 and 200 and the support substrates 10 and 20 may be increased by a fusion bond due to the high temperature.

Next, the liquid crystal layer is formed and the upper and lower thin film substrates 100 and 200 are bonded (S50). The liquid crystal layer may be formed and then the upper and lower thin film substrates 100 and 200 may be bonded or the upper and lower thin film substrates 100 and 200 may be bonded and then the liquid crystal layer may be formed. After a liquid crystal drops on any one of the thin substrates 100 and 200 by methods such as inkjet printing, the thin film substrates 100 and 200 may be bonded to each other and after the two thin film substrates 100 and 200 are bonded to each other, the liquid crystal may be injected through an inlet between the two thin film substrates 100 and 200. During the bonding process, a process for scattering a spacer, a process of applying a sealant, and the like may be performed. The substrates in the state in which the upper and lower thin film substrates 100 and 200 are bonded to each other while adhering to the support substrates 10 and 20 may form the substrate laminates 100, and 200, and support substrates 10, and 20.

For example, when the upper and lower thin film substrates 100 and 200 are bonded in the state in which the support substrates 10 and 20 are adhered to each other, the thin film substrates 100 and 200 may be peeled from the support substrates 10 and 20 (S60).

As illustrated in FIGS. 9 and 10, the support substrates 10 and 20 may be separated (S60) by inserting the entrance portion 51 of the knife 50 into the adhering surfaces between the support substrates 10 and 20 and the thin film substrates 100 and 200 to perform the initial peeling and then separating the support substrates 10 and 20. The bonded two thin film substrates 100 and 200 may be separated by using a vacuum/adsorption jig.

For initially peeling the support substrates 10 and 20 from the thin film substrates 100 and 200, the substrate laminates 100, and 200, and support substrates 10, and 20 may be supported on the stage 300 and the stage 300 may rotate so that the portion at which the auxiliary stage 320 is disposed may be aligned with the entrance portion 51 of the knife 50. The initial peeling may be performed using the knife 50.

The initial peeling may be performed by inserting the knife 50 at an initial insertion angle θ2 of the knife 50 which may be about 2° to about 20° and the peeling may be performed by applying a torque of about 0.3 mm to about 0.4 mm in a direction of the support substrates 10 and 20.

When the initial insertion angle θ2 of the knife 50 is too small, the thin film substrates 100 and 200 may be broken and it may be difficult to perform the initial peeling of the support substrates 100 and 200. When the initial insertion angle θ2 of the knife 50 is too large, the knife 50 may stick to the upper support substrate 20 and the lower support substrate 10, such that the entrance portion 51 of the knife 50 might not reach the thin film substrates 100 and 200.

After separating the support substrates 10 and 20, only the bonded upper and lower thin film substrates 100 and 200 which are formed of the thin film substrates 100 and 200 are present. According to an exemplary embodiment of the present invention, when the upper and lower thin film substrates 100 and 200 are manufactured using the thin film substrates 100 and 200 having a thickness of about 0.1 mm, the final thickness might be about 0.2 mm even when the thin film substrates 100 and 200 are bonded to each other, such that the etching process for making the thin liquid crystal display panel is not required.

The upper and lower thin film substrates 100 and 200 which are bonded to each other but peeled from the support substrates 10 and 20 may be cut at a predetermined size (S70), and the liquid crystal display panel may be completed. A polarizer may adhere before or after cutting the bonded thin film substrates 100 and 200.

A stage in the manufacturing device for a liquid crystal display panel according to an exemplary embodiment of the present invention will be described in more detail below with reference to FIG. 11.

Figure 11:
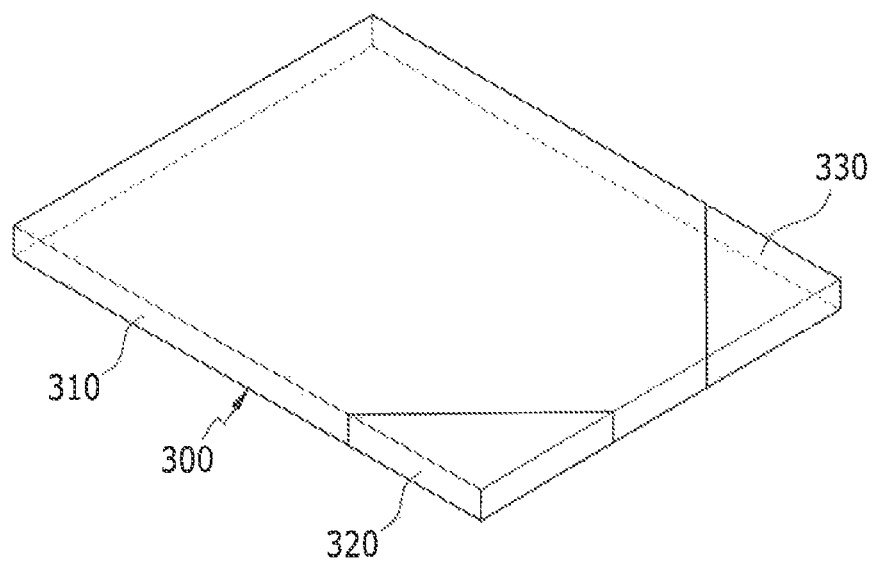
FIG. 11 is a perspective view illustrating a stage in a manufacturing device for a liquid crystal display panel according to an exemplary embodiment of the present invention.

FIG. 11 is a perspective view illustrating a stage in a manufacturing device for a liquid crystal display panel according to an exemplary embodiment of the present invention.

Since the manufacturing device for a liquid crystal display panel according to an exemplary embodiment of the present invention is substantially the same as the exemplary embodiment of the present invention illustrated in FIGS. 1 to 3, except for only the form of the stage 300, the overlapping descriptions thereof may be omitted.

As illustrated in FIG. 11, the stage 300 in the manufacturing device for a liquid crystal display panel according to an exemplary embodiment of the present invention may include the main stage 310 and the two auxiliary stages 320 and 330.

As described above, when the stage 300 of the manufacturing device for a liquid crystal display panel according to an exemplary embodiment of the present invention rotates, even though the auxiliary stages 310 and 320 are formed at a corner of the stage 300, the stage 300 may rotate so that the knife 50 may be aligned with the substrate laminates 100, and 200, or support substrates 10, and 20. The stage 300 in the manufacturing device for a liquid crystal display panel according to an exemplary embodiment of the present invention may be provided with a plurality of auxiliary stages 320 and 330. For example, FIG. 11 illustrates that the two auxiliary stages 320 and 330 may be formed. However, the exemplary embodiment of the present invention is not limited thereto, and three auxiliary stages may be formed or the auxiliary stages may be formed at all corners of the stages.

When the auxiliary stage 320 is formed in plural, the initial peeling may be performed at a plurality of corners.

When the initial peeling is performed at the plurality of corners, a total separation time of the support substrates 10 and 20 may be reduced.

A stage in the manufacturing device for a liquid crystal display panel according to an exemplary embodiment of the present invention will be described in more detail below with reference to FIGS. 12 and 13.

Since the manufacturing device for a liquid crystal display panel according to an exemplary embodiment of the present invention is substantially the same as that according to the exemplary embodiment of the present invention illustrated in FIGS. 1 to 3, except for a form of the stage 300, the overlapping description thereof may be omitted.

Figure 12:
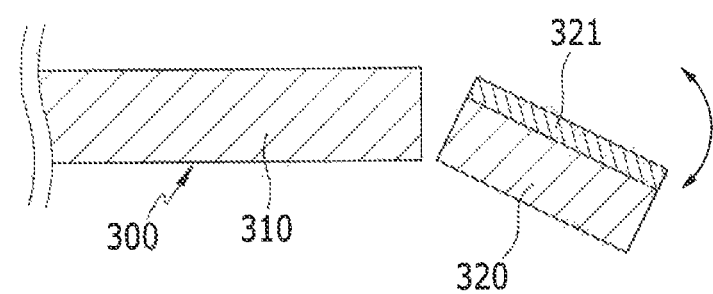
FIG. 12 is a diagram illustrating a stage in a manufacturing device for a liquid crystal display panel according to an exemplary embodiment of the present invention.

As illustrated in FIG. 12, the stage 300 in the manufacturing device for a liquid crystal display panel according to an exemplary embodiment of the present invention may include the main stage 310, the auxiliary stage 320, and an adsorption portion 321 formed on the auxiliary stage 320.

Unlike the auxiliary stage 320 according to an exemplary embodiment of the present invention, which is illustrated in FIGS. 1 to 3, the auxiliary stage 320 may move by being tilted, and not by being moved downward from the surface of the stage 300 or vertically moved upward to be disposed on the surface of the stage 300.

An upper portion of the auxiliary stage 320 may include the adsorption portion 321 which may adsorb the tip portions of the support substrates 10 and 20.

Figure 13:
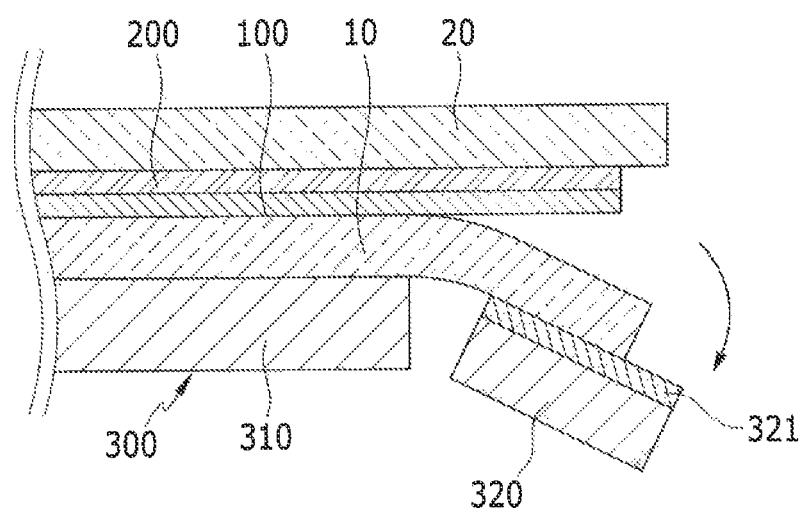
FIG. 13 is a diagram illustrating a form in which a support substrate is initially peeled using the stage of the manufacturing device for a liquid crystal display panel according to an exemplary embodiment of the present invention.

Referring to FIG. 13, the stage 300 in the manufacturing device for a liquid crystal display panel according to an exemplary embodiment of the present invention may include the adsorption portion 321 and the tiltable auxiliary stage 320 to slightly peel the tips at which the thin film substrates 100 and 200 are bonded to the support substrates 10 and 20 using the knife 50 at the time of initially peeling the support substrates 10 and 20 and then perform additional peeling using the auxiliary stage 320.

For example, when the initial peeling is performed using the auxiliary stage 320 and the adsorption portion 321 of the auxiliary stage 320, the entrance portion 51 of the knife 50 may be relatively small, and yet it is possible to prevent breakages such as a scratch which may occur in the support substrates 10 and 20 such that the reuse rate of the support substrates 10 and 20 may be increased.

When the adhesion between the support substrates 10 and 20 and the thin film substrates 100 and 200 is relatively weak, the auxiliary stage 320 may be tilted as the support substrates 10 and 20 are adsorbed into the adsorption portion 321 of the auxiliary stage 320, such that the corner portions of the support substrates 10 and 20 may be initially peeled without using the knife 50.

As described above, the method for manufacturing a liquid crystal display panel and the manufacturing device therefor according to exemplary embodiments of the present invention may peel the support substrates 10 and 20 from the thin film substrates 100 and 200, and may minimize the occurrence of scratches in the support substrate. The reuse rate of the support substrates 10 and 20 may be increased, and the thin film substrates 100 and 200 might not to be broken.

While the present invention has been shown and described with reference to the exemplary embodiments thereof, it will be apparent to those of ordinary skill in the art that various changes in form and detail may be made thereto without departing from the spirit and scope of the invention as defined by the following claims.

What is claimed is:

1. A manufacturing device for a liquid crystal display panel, comprising:
   a stage including a first stage part and a second stage part;
   a support substrate disposed on the stage, wherein a bottom surface of the support substrate is in contact with the first stage part and the second stage part;
   a substrate laminate disposed on the support substrate; and
   a knife including an entrance portion and a rigidity securing portion, wherein the knife is positioned with an upper surface of the knife in contact with a lower surface of the substrate laminate and a lower surface of the knife in contact with the support substrate,
   wherein the rigidity securing portion of the knife is thicker than the entrance portion of the knife.

2. The manufacturing device of claim 1, wherein:
   the second stage part is disposed at a corner of the stage, and the second stage part is configured to move vertically in a downward direction from a surface on which the stage is disposed.

3. The manufacturing device of claim 2, wherein:
   the second stage part is configured to be fixed to the first stage part when the first stage part supports the substrate laminate and after initially peeling the substrate laminate, and
   the second stage part is configured to move in a downward direction from a surface of the first stage part when the knife for peeling the support substrate from the substrate laminate contacts the support substrate.

4. The manufacturing device of claim 1, wherein:
   the entrance portion of the knife has a tapered shape,
   the rigidity securing portion of the knife includes a first portion and a second portion, and
   the second portion is thicker than the first portion.

5. The manufacturing device of claim 4, wherein:
   a tapered angle of the entrance portion of the knife is about 5° to about 15°.

6. The manufacturing device of claim 5, wherein:
   a central portion of the knife has a thickness of about 0.1 mm to about 0.2 mm.

7. The manufacturing device of claim 4, wherein:
   a length ratio of the entrance portion, the first portion, and the second portion of the knife is about 1:1:1.

8. The manufacturing device of claim 4, wherein:
   a thickness of the second portion of the knife is about 0.5 mm to about 2 mm.

9. The manufacturing device of claim 8, wherein:
   a thickness ratio of the first portion and the second portion of the knife is about 1:2.

10. The manufacturing device of claim 1, wherein:
    the second stage part further includes an adsorption portion which is disposed on an upper surface of the second stage part, and
    the second stage part is tilted with respect to the surface of the first stage part.

11. The manufacturing device of claim 10, wherein:
    the adsorption portion is configured to adsorb the support substrate.

* * * * *